US011673303B2

(12) United States Patent
Sangiorgi et al.

(10) Patent No.: US 11,673,303 B2
(45) Date of Patent: Jun. 13, 2023

(54) INJECTION MOLDING APPARATUS WITH HOT RUNNERS

(71) Applicant: SACMI IMOLA S.C., Imola (IT)

(72) Inventors: Gabriele Sangiorgi, Faenza (IT); Marco Fini, Bologna (IT); Davide Penazzi, Imola (IT)

(73) Assignee: SACMI IMOLA S.C., Imola (IT)

( * ) Notice: Subject to any disclaimer, the term of this patent is extended or adjusted under 35 U.S.C. 154(b) by 0 days.

(21) Appl. No.: 16/876,679

(22) Filed: May 18, 2020

(65) Prior Publication Data

US 2020/0368952 A1    Nov. 26, 2020

(30) Foreign Application Priority Data

May 20, 2019    (IT) .......................... 102019000006997

(51) Int. Cl.
*B29C 45/27*    (2006.01)
*B29C 45/28*    (2006.01)

(52) U.S. Cl.
CPC .......... *B29C 45/2725* (2013.01); *B29C 45/28* (2013.01)

(58) Field of Classification Search
CPC .............. B29C 45/2727; B29C 45/281; B29C 45/2803; B29C 2045/2827; B29C 2045/2817; B29C 2045/2733; B29C 2045/273; B29C 2045/2885; B29C 2045/2851; B29C 45/2806; B29C 45/28; B29C 45/2725
See application file for complete search history.

(56) References Cited

U.S. PATENT DOCUMENTS 5,022,846 A * 6/1991 Schmidt ................ B29C 45/281
264/328.15
5,127,819 A * 7/1992 Wright ................ B29C 45/2806
264/328.15
(Continued)

FOREIGN PATENT DOCUMENTS

EP    0491332 A2    6/1992
JP    S61268421 A   11/1986
(Continued)

OTHER PUBLICATIONS

IT Search Report dated Jan. 17, 2020 re: Application No. IT 102019000006997, pp. 1-7, citing: WO 2011/161590 A1, US 2006/00204611 A, JP H04 67923 A and JP S61 268421 A.
(Continued)

*Primary Examiner* — Emmanuel S Luk
(74) *Attorney, Agent, or Firm* — Cantor Colburn LLP

(57) ABSTRACT

An injection molding apparatus with hot runners includes a rear plate that supports at least one manifold, wherein a first face of the rear plate that contains the main manifold is in direct contact with a first face of the manifold plate substantially on the entire flat surface of the first face of the manifold plate which is not affected by the recesses which, in the manifold plate, accommodate the secondary manifolds.

The manifold plate has nozzles, and the actuators of the injection nozzles are completely external to the rear plate, are completely inside recesses of the manifold plate, and are arranged so that a respective piston cylinder is compressed between the first face of the rear plate and the secondary manifold.

6 Claims, 2 Drawing Sheets

(56) References Cited

U.S. PATENT DOCUMENTS

| | | | | |
|---|---|---|---|---|
| 5,223,275 A * | 6/1993 | Gellert | ............... | B29C 45/1603 264/328.8 |
| 6,638,049 B1 * | 10/2003 | Moss | ............... | B29C 45/1603 425/145 |
| 7,802,983 B2 * | 9/2010 | Fischer | ............... | B29C 45/78 425/570 |
| 9,248,594 B2 * | 2/2016 | Spuller | ............... | B29C 45/20 |
| 2003/0224086 A1 * | 12/2003 | Olaru | ............... | B29C 45/281 425/562 |
| 2004/0047935 A1 * | 3/2004 | Moss | ............... | B29C 45/2704 425/145 |
| 2004/0191358 A1 * | 9/2004 | Gellert | ............... | B29C 45/2727 425/570 |
| 2006/0003038 A1 * | 1/2006 | Serniuck | ............... | B29C 45/1642 425/130 |
| 2006/0108713 A1 * | 5/2006 | Niewels | ............... | B29C 45/2806 264/328.1 |
| 2006/0204611 A1 | 9/2006 | Serniuk et al. | | |
| 2006/0228442 A1 * | 10/2006 | Fischer | ............... | B29C 45/78 425/572 |
| 2007/0082082 A1 * | 4/2007 | Feick | ............... | B29C 45/281 425/549 |
| 2008/0206396 A1 * | 8/2008 | Bouti | ............... | C21D 9/00 425/549 |
| 2009/0236774 A1 * | 9/2009 | Blais | ............... | B29C 45/278 264/328.8 |
| 2010/0183763 A1 * | 7/2010 | Babin | ............... | B29C 45/2806 425/549 |
| 2010/0233311 A1 * | 9/2010 | Tapuchievici | ............... | B29C 45/281 425/563 |
| 2011/0123668 A1 * | 5/2011 | Budapanahalli | ............... | B29C 45/2727 425/573 |
| 2011/0293774 A1 * | 12/2011 | Scheffer | ............... | B29C 45/2727 425/549 |
| 2012/0258192 A1 * | 10/2012 | Novo | ............... | B29C 45/2725 425/547 |
| 2015/0158223 A1 * | 6/2015 | Fairy | ............... | B29C 45/2727 425/549 |
| 2017/0217066 A1 * | 8/2017 | Galati | ............... | B29C 45/2738 |
| 2018/0015652 A1 * | 1/2018 | Galati | ............... | B29C 45/77 |
| 2019/0111600 A1 * | 4/2019 | Qian | ............... | B29C 45/231 |
| 2019/0329469 A1 * | 10/2019 | Bajwa | ............... | B29C 45/27 |
| 2020/0061892 A1 * | 2/2020 | Asuka | ............... | B29C 45/2727 |
| 2020/0254668 A1 * | 8/2020 | Lee | ............... | B29C 45/7331 |
| 2020/0290252 A1 * | 9/2020 | Boson | ............... | B29C 45/2806 |

FOREIGN PATENT DOCUMENTS

| | | |
|---|---|---|
| JP | H0467923 A | 3/1992 |
| WO | 2011161590 A1 | 12/2011 |

OTHER PUBLICATIONS

EP Search Report dated Oct. 2, 2020 re: Application No. 20174417. 4-1014, pp. 1-5, citing: WO 2011/161590 A1, US 2006/0204611 A1, JP H04 67923 A, JP S61 268421 A and EP 0 491 332 A2.

* cited by examiner

INJECTION MOLDING APPARATUS WITH HOT RUNNERS

CROSS-REFERENCE TO RELATED APPLICATIONS

This application is related to, and claims the benefit of, Italian patent application No. 102019000006997, filed on May 20, 2019, the contents of which are hereby incorporated by reference in their entirety.

TECHNICAL FIELD

The present disclosure relates to an injection molding apparatus with hot runners, particularly for producing preforms from which containers or bottles are to be obtained by blow molding.

BACKGROUND

WO2011/161590 describes a hot runner injection system which comprises a secondary manifold with hot runner that has at least one injection nozzle, which is closed by a valve stem actuated by a double-acting pneumatic linear actuator. The piston cylinder of the actuator is compressed between a rear plate (also known as supporting plate) and the secondary manifold. For this purpose, the piston cylinder of this prior solution is accommodated in a seat provided within the rear plate. An additional recess is present on the same face of the rear plate in which the seats of said piston cylinders are provided and accommodates a main manifold with hot runner which is fastened directly on the secondary manifolds.

One drawback of this known solution is that it increases the complexity of the manufacture of the rear plate, since it is necessary to provide on one of its faces a plurality of cylindrical seats for each actuator for the opening/closing of the nozzles and for the main manifold.

Furthermore, due to the recess of the main manifold provided on the same face of the rear plate on which the seats of the nozzle actuators are provided, said actuator seats must necessarily be arranged around the recess of the rear plate in which the main manifold is fixed.

SUMMARY

The aim of the present disclosure is to provide an injection molding apparatus that is capable of improving the background art in one or more of the aspects indicated above.

Within this aim, the disclosure simplifies the structure and manufacture of the rear plate or supporting plate.

The present disclosure further overcomes the drawbacks of the background art in a manner that is alternative to any existing solutions.

The disclosure also provides an injection molding apparatus that is highly reliable, relatively easy to provide and at competitive costs.

This aim, as well as these and other advantages which will become better apparent hereinafter, are achieved by providing an injection molding apparatus according to claim 1, optionally provided with one or more of the characteristics of the dependent claims.

BRIEF DESCRIPTION OF THE DRAWINGS

Further characteristics and advantages of the disclosure will become better apparent from the description of a preferred but not exclusive embodiment of the injection molding apparatus according to the disclosure, illustrated by way of non-limiting example in the accompanying drawings, wherein.

DETAILED DESCRIPTION OF THE DRAWINGS

Figure 1:
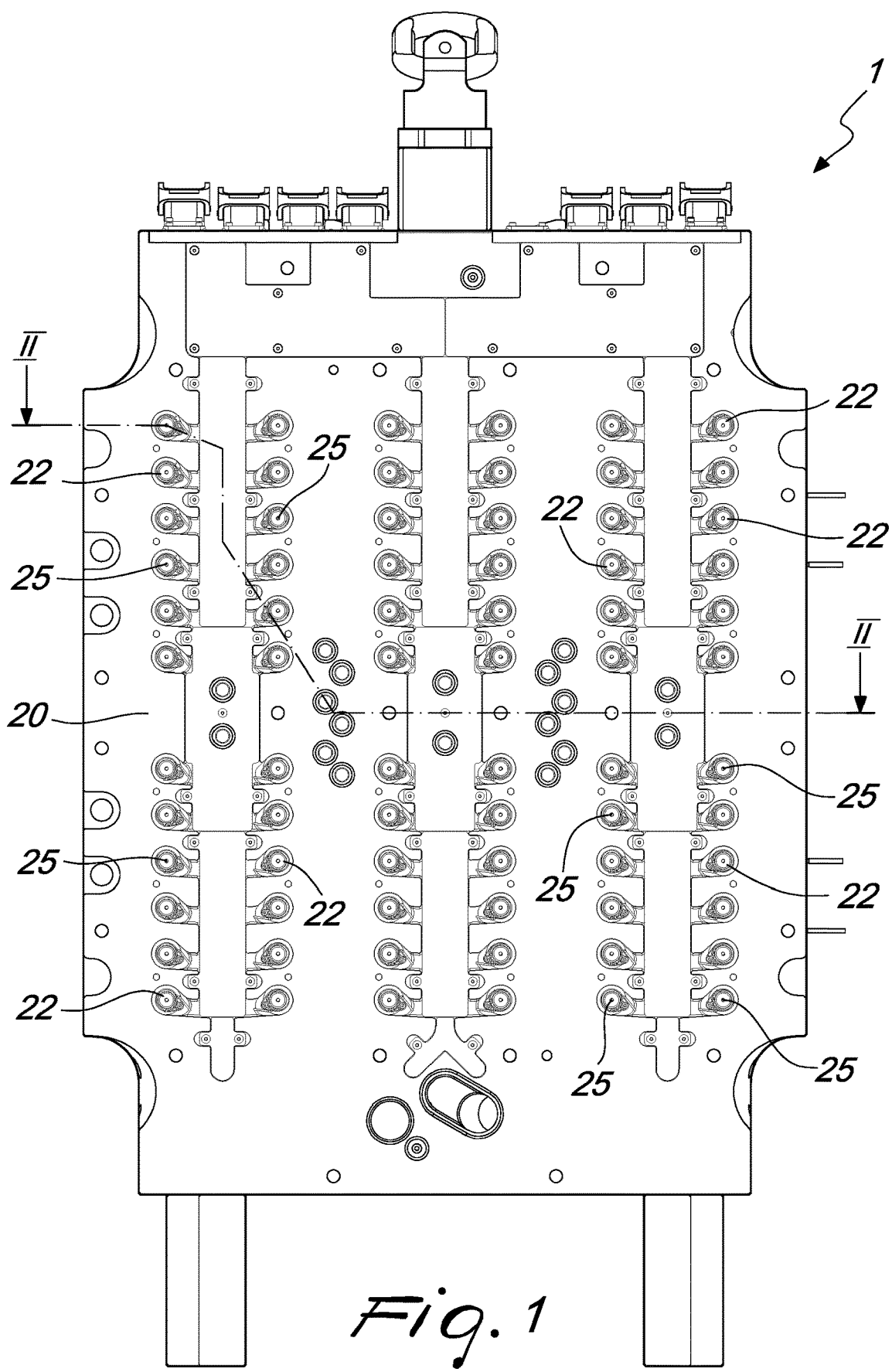
FIG. 1 is an elevation view, from the nozzle side, of the apparatus according to the disclosure.
Figure 2:
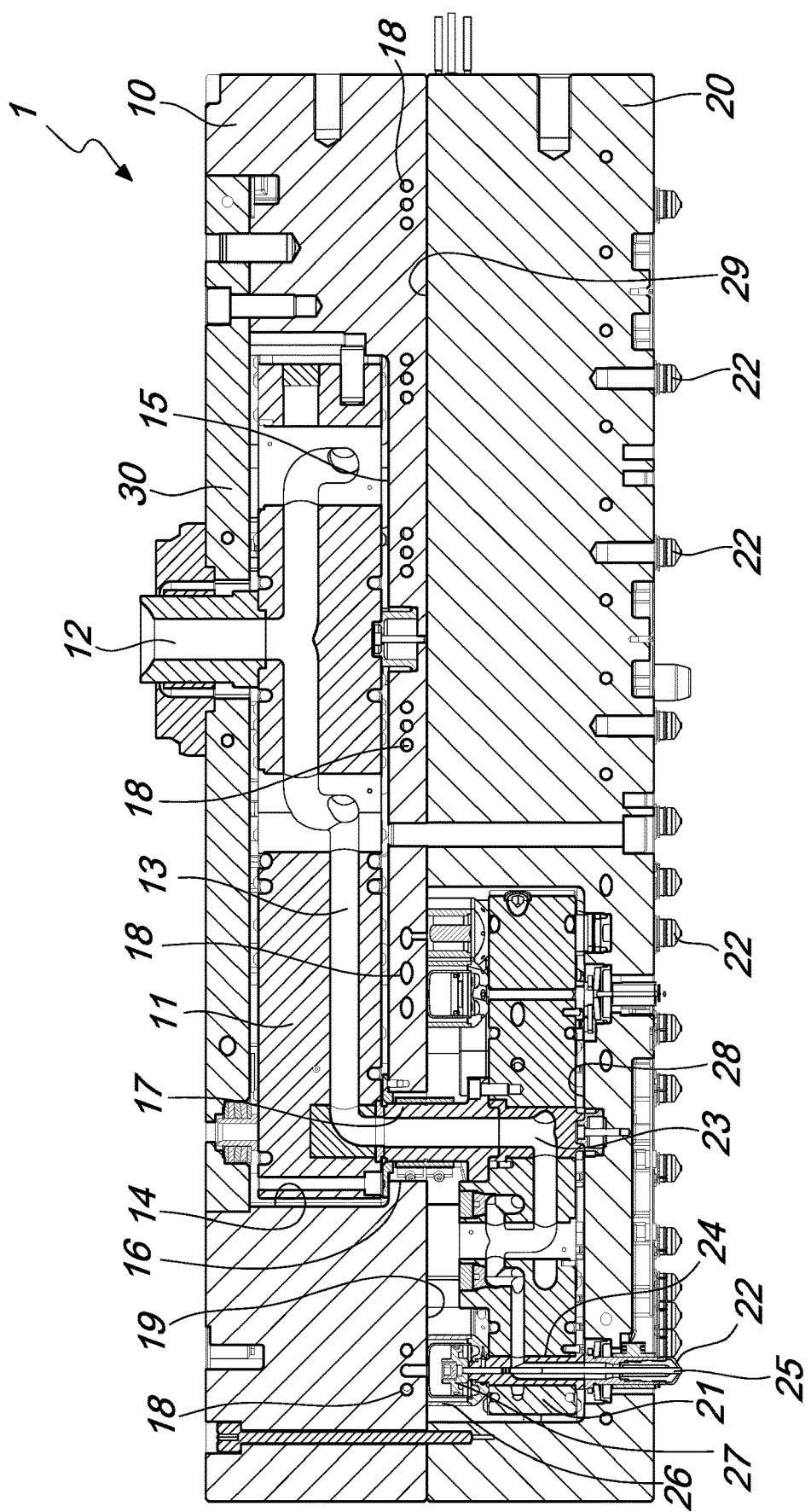
FIG. 2 is a sectional view, taken along the sequence of planes II-II of FIG. 1.

With reference to the figures, the apparatus for the injection molding of plastic material according to the disclosure, designated generally by the reference numeral 1, is of the type with hot runners and comprises a rear plate 10 which supports at least one main manifold 11 with hot runners and a manifold plate 20 which is fastened to the rear plate 10 and supports a plurality of secondary manifolds 21 with hot runners.

The rear plate 10 is crossed by a plurality of air channels 18 which communicate at least partly with a first flat face 19 of the rear plate 10 and convey air or other fluid from and toward the first face 19 in order to actuate respective actuators, described hereinafter.

Furthermore, the rear plate 10 can be crossed by cooling channels, which can coincide at least partly with the air channels 18.

The main manifold 11 can have a main entry opening 12, for receiving a stream of molten plastic material, for example PET, and a plurality of main hot runners 13 which branch from the entry opening, so as to convey the stream toward the secondary manifolds 21. For example, each main hot runner 13 is connected to a respective bushing 17 which passes through the rear plate 10 and connects the main hot runner 13 to the inlet 23 of a respective secondary manifold 21, from which secondary hot runners 24 extend.

The secondary manifolds 21 are accommodated in recesses 28 provided on a first flat face 29 of the manifold plate 20, which are open toward the rear plate 10 with such an extension as to be able to insert the secondary manifolds 21 in the manifold plate 20 on the side of its first face 29, during the assembly of the apparatus 1.

The first face 19 of the rear plate 10 is in direct contact with the first face 29 of the manifold plate 20 substantially on the entire flat surface of the first face 29 of the manifold plate 20 that is not affected by the recesses 28 of the secondary manifolds 21.

Furthermore, the manifold plate 20 comprises a plurality of nozzles 22 which are configured to inject the stream of molten plastic material into a respective mold cavity, which can be a cavity the shape of which corresponds to a preform from which a bottle is to be obtained subsequently in a separate blow molding station.

The secondary manifolds 21 feed respective groups of said nozzles 22 (for example groups of six, eight or ten nozzles as in FIG. 1) with the stream of molten plastic material, through the secondary hot runners 24 which communicate with the main hot runners 13 of the main manifold 11.

At each nozzle 22 of each one of these groups of nozzles there is a valve stem 25 for controlling, in a per se known manner, the stream of molten plastic material through the respective nozzle 22. At least part of the valve stem 25 passes through the secondary manifold 21 that feeds the respective group of nozzles 22.

An actuator is associated with each valve stem 25 and can be actuated via the air or other actuation fluid that flows in the air channels 18. The actuator comprises a piston cylinder 26 and a piston 27 which can slide hermetically within the piston cylinder 26 and is connected to the valve stem 25 in order to open and close the respective nozzle 22.

According to an aspect of the disclosure, the actuators, and in particular the piston cylinder 26 and the piston 27, are completely external to the rear plate 10, i.e., they are not accommodated, not even partly, within the rear plate 10. This simplifies considerably the manufacture of the rear plate 10.

The actuators are instead accommodated completely within the recesses 28 of the manifold plate 20 so that each recess 28 fully accommodates a plurality of these actuators, which are adapted to open and close the nozzles associated with the secondary manifold 21 of that recess 28.

Moreover, the actuators are arranged so that the respective piston cylinder 26 is compressed between the first face 19 of the rear plate 10 and the secondary manifold 21 crossed by the respective valve stem 25 associated with the actuator and communicates with at least one of the air channels 18 of the rear plate 10 through the first face 19, in order to be able to move the corresponding piston 27 by means of the air or other actuation fluid that is conveyed by the air channels 18.

Preferably, the piston cylinder 26 communicates with the air channels 18 by means of two openings which lead onto the first face 19 of the rear plate 10: one to move the piston 27 toward the closure position of the stem 25 and the other to move the piston 27 toward the open position of the stem 25. The internal structure of the piston cylinder 26 adapted to obtain this double action, as well as the guiding of the valve stem 25 in the secondary manifolds 21 and the support of the nozzles 22 on the manifold plate 20, are per se known and described for example in WO2011/161590.

In order to accommodate the main manifold 11, the rear plate 10 preferably comprises a recess 14 which is provided on a second face that is opposite the first face 19 of the plate 10.

Preferably, in order to support the main manifold 11 in the recess 14, the latter is closed by a cover 30 which is fastened onto the second face of the rear plate 10 and is crossed by the main entry opening 12 of the stream of molten plastic material.

The recess 14 has a base 15 which is integrated in the rear plate 10 and the outer surface of which is part of the first face 19 of the rear plate 10.

The base 15 of the recess 14 is crossed by openings 16 for the passage of the stream of molten plastic material from the main manifold 11 to the secondary manifolds 21. In particular, these openings 16 are crossed by the bushings 17 which connect the main hot runners 13 to the respective inlets 23 of the secondary manifolds 21.

Advantageously, the base 15 of the recess 14 of the rear plate 10 is crossed at least partly by said air channels 18, which preferably lead onto the first face 19 also at said base 15.

In this manner, some of the piston cylinders 16 can be compressed between the first face 19 of the rear plate 10 and the respective secondary manifold 21 at the base 15 of the recess 14, so that the main manifold 11 and some actuators of the secondary manifolds 21 are partially superimposed, with the interposition exclusively of the base 15 of the recess 14 of the rear plate 10.

The operation of the injection molding apparatus is evident from what has been described above and is not part of the present disclosure. Each actuator, by means of appropriate pneumatic or hydraulic controls, is actuated by means of the air channels 18 and moves the corresponding valve stem 25 to open and close the corresponding injection nozzle 22. Each piston cylinder 26 and each nozzle 22 are advantageously subjected to a compression load between the rear plate 10 and the manifold plate 20 and therefore it is possible to avoid any leakage of air or other actuation fluid of the actuator and of the molten plastic material to be injected.

In practice it has been found that the disclosure achieves the intended aim and objects, providing a structure of plates for injection molding apparatuses that are less complicated to manufacture.

The disclosure thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The invention claimed is:

1. An injection molding apparatus with hot runners, the injection molding apparatus comprising:
    a rear plate, which supports at least one main manifold with hot runners and is crossed by a plurality of air channels which communicate at least partly with a first face of said rear plate;
    a manifold plate, which is fastened to said rear plate and has a plurality of nozzles configured to inject a stream of molten plastic material in a respective molding cavity, said manifold plate supporting a plurality of secondary manifolds with hot runners which are configured to feed respective groups of said nozzles with said stream of molten plastic material and communicate with the air channels of the rear plate, said secondary manifolds being accommodated in recesses of said manifold plate which are open toward said rear plate;
    at each nozzle of each nozzle group, a valve stem for controlling said flow of molten plastic material through said nozzle, in which at least one part of said valve stem passes through the secondary manifold which feeds the respective nozzle group;
    for each valve stem, an actuator which has a piston cylinder and a piston which can slide hermetically within said piston cylinder and is connected to said valve stem in order to open and close the respective nozzle;
    wherein:
    said first face of the rear plate is in direct contact with a first face of the manifold plate substantially on the entire flat surface of the first face of the manifold plate which is not affected by said recesses of the manifold plate;
    said actuators are completely external to the rear plate, are completely inside said recesses of the manifold plate and are arranged so that the respective piston cylinder is compressed between the first face of said rear plate and the secondary manifold which is crossed by the respective valve stem of the actuator and communicates with at least one of the air channels of said rear plate.

2. The apparatus according to claim 1, wherein said rear plate comprises a recess which is provided on a second face disposed opposite said first face of the rear plate and accommodates said main manifold with hot runners, said recess comprising a base which is crossed by openings for the passage of the stream of molten plastic material from the main manifold to the secondary manifolds.

3. The apparatus according to claim 2, wherein said base of the recess of the rear plate is crossed at least partly by said air channels.

4. The apparatus according to claim 3, wherein said air channels lead out onto said first face of the rear plate also at said base of the recess.

5. The apparatus according to claim 2, wherein some of said piston cylinders are compressed between the first face of said rear plate and the respective secondary manifold at said base of the recess of said rear plate.

6. The apparatus according to claim 2, wherein said recess is closed by a cover which is fastened onto said second face of the rear plate and is crossed by a main entry opening for the stream of molten plastic material.

* * * * *